(12) United States Patent
Pariag et al.

(10) Patent No.: US 8,898,018 B2
(45) Date of Patent: Nov. 25, 2014

(54) METHODS AND SYSTEMS FOR HYDROCARBON PRODUCTION

(75) Inventors: Shiva Pariag, Campeche (MX); Hendry Lopez, Campeche (MX); Luis Manuel Doria, Tamaulipas (MX); Umberto Marseglia, Estado de Mexico (MX)

(73) Assignee: Schlumberger Technology Corporation, Sugar Land, TX (US)

( * ) Notice: Subject to any disclaimer, the term of this patent is extended or adjusted under 35 U.S.C. 154(b) by 1463 days.

(21) Appl. No.: 11/830,942

(22) Filed: Jul. 31, 2007

(65) Prior Publication Data

US 2008/0221798 A1    Sep. 11, 2008

Related U.S. Application Data

(60) Provisional application No. 60/893,224, filed on Mar. 6, 2007.

(51) Int. Cl.
   *G01V 9/00*    (2006.01)

(52) U.S. Cl.
   CPC ..................... *G01V 9/00* (2013.01)
   USPC .................. 702/13; 702/23; 702/50

(58) Field of Classification Search
   USPC ........... 702/2, 6, 9, 11–13, 22–24, 27, 33, 45, 702/50, 55, 100
   See application file for complete search history.

(56) References Cited

U.S. PATENT DOCUMENTS

| | | | |
|---|---|---|---|
| 1,973,901 A * | 9/1934 | Ingram | 208/273 |
| 4,854,164 A | 8/1989 | Rhoads | |
| 5,531,865 A * | 7/1996 | Cole | 205/751 |
| 5,663,492 A * | 9/1997 | Alapati et al. | 73/64.45 |
| 5,762,149 A * | 6/1998 | Donovan et al. | 175/40 |
| 6,027,332 A | 2/2000 | Glotin | |
| 6,041,856 A | 3/2000 | Thrasher et al. | |
| 6,236,894 B1 | 5/2001 | Stoisits et al. | |
| 6,265,713 B1 | 7/2001 | Berard | |
| 6,286,367 B1 | 9/2001 | Segeral | |
| 6,389,908 B1 | 5/2002 | Chevalier | |
| 6,405,604 B1 | 6/2002 | Berard | |
| 6,434,435 B1 | 8/2002 | Tubel | |
| 6,864,801 B2 | 3/2005 | Tabanou | |

(Continued)

FOREIGN PATENT DOCUMENTS

| | | |
|---|---|---|
| CA | 2231321 C | 6/2000 |
| CA | 2397040 A1 | 2/2003 |

(Continued)

*Primary Examiner* — Mischita Henson

(74) *Attorney, Agent, or Firm* — Jeffery R. Peterson; Brandon S. Clark

(57) ABSTRACT

Methods and systems are described for hydrocarbon production. One method embodiment of the invention comprises analyzing phases of hydrocarbon oil, gas and water at flowing conditions extracted from a hydrocarbon well; separating the oil, water and gas mixture into oil portions, water portions and gas portions, each respective portion being substantially only oil, water or gas; analyzing the separated oil portion and determining if the separated oil portion meets predetermined oil standards, and treating any separated oil portion that does not meet the oil standards to achieve those standards; transferring the oil portion meeting the predetermined oil standards to a predetermined destination; analyzing the separated water portion to determine if the water portion meets predetermined water standards and treating any separated water portion that does not meet the water standards to achieve those standards; and transferring the treated water portion meeting the predetermined standards to a destination.

5 Claims, 6 Drawing Sheets

(56) References Cited

U.S. PATENT DOCUMENTS

| | | |
|---|---|---|
| 6,943,697 B2 | 9/2005 | Ciglenec |
| 6,959,588 B2 | 11/2005 | Zougari et al. |
| 7,114,557 B2 | 10/2006 | Cudmore |
| 7,142,986 B2 | 11/2006 | Moran |
| 7,147,059 B2 | 12/2006 | Hirsch |
| 7,150,183 B2 | 12/2006 | Kharrat et al. |
| 7,172,037 B2 | 2/2007 | Dashevskiy |
| 7,261,162 B2 | 8/2007 | Deans |
| 7,261,167 B2 | 8/2007 | Goldman |
| 7,277,796 B2 | 10/2007 | Kuchuk |
| 7,523,648 B2 | 4/2009 | Zougari |
| 2002/0029883 A1 | 3/2002 | Vinegar et al. |
| 2002/0100584 A1 | 8/2002 | Couet et al. |
| 2003/0083206 A1 | 5/2003 | Masikewich et al. |
| 2003/0110017 A1 | 6/2003 | Guthrie et al. |
| 2003/0201098 A1* | 10/2003 | Karanikas et al. ............ 166/53 |
| 2004/0189314 A1 | 9/2004 | Le Foll |
| 2004/0223853 A1 | 11/2004 | Khomynets et al. |
| 2004/0232362 A1* | 11/2004 | Prelewitz .................... 250/573 |
| 2004/0254734 A1 | 12/2004 | Zabalza-Mezghani et al. |
| 2005/0016292 A1* | 1/2005 | Dutton et al. ............ 73/861.03 |
| 2005/0173114 A1 | 8/2005 | Cudmore |
| 2005/0194131 A1 | 9/2005 | Tseytlin |
| 2005/0267718 A1 | 12/2005 | Guyaguler et al. |
| 2006/0155474 A1* | 7/2006 | Venkataramanan et al. .... 702/13 |

FOREIGN PATENT DOCUMENTS

| | | |
|---|---|---|
| CA | 2450766 A1 | 6/2005 |
| CN | 1169330 A | 1/1998 |
| CN | 1418572 A | 5/2003 |
| CN | 1632069 A | 6/2005 |
| EP | 1658360 A1 | 5/2006 |
| GB | 2328024 A | 2/1999 |
| JP | 08225788 A | 9/1996 |
| MX | PA02007176 A | 1/2003 |
| MX | 05005466 | 2/2006 |
| RU | 2140523 C1 | 10/1999 |
| RU | 2163660 C1 | 2/2001 |
| RU | 2165520 C2 | 4/2001 |
| RU | 2188934 C2 | 9/2002 |
| RU | 2189504 C1 | 9/2002 |
| RU | 2190781 C1 | 10/2002 |
| RU | 2191896 C2 | 10/2002 |
| RU | 2210094 C1 | 8/2003 |
| RU | 2002126207 A | 2/2004 |
| RU | 2235350 C1 | 8/2004 |
| RU | 2236030 C1 | 9/2004 |
| RU | 2241858 C1 | 12/2004 |
| RU | 2241864 C1 | 12/2004 |
| RU | 2253761 C1 | 6/2005 |
| RU | 2265716 C1 | 12/2005 |
| RU | 2274747 C2 | 4/2006 |
| RU | 2285788 C2 | 10/2006 |
| SU | 584317 A1 | 12/1977 |
| WO | 0123705 A1 | 4/2001 |
| WO | 0218744 A2 | 3/2002 |
| WO | 2006003118 A1 | 1/2006 |

* cited by examiner

METHODS AND SYSTEMS FOR HYDROCARBON PRODUCTION

CROSS-REFERENCE TO RELATED APPLICATIONS

The present application claims priority under 35 U.S.C. §119(e) to U.S. Provisional Application Ser. No. 60/893,224, filed Mar. 6, 2007, incorporated by reference herein in its entirety.

BACKGROUND OF THE INVENTION

1. Field of Invention

The present invention relates generally to the field of fluid transfer, and more specifically to fluid transfer in connection with wells, and more specifically to hydrocarbon production from hydrocarbon-containing wells.

2. Related Art

After a hydrocarbon-bearing well has been drilled and made safe the well may then be placed into production where the hydrocarbon oil and gas are flowed to process stations where the effluents are processed and released for sale in the form of different products. "Hydrocarbon production" is a combination of many operations. First, it is necessary to bring the mixture of hydrocarbon oil, gas, water, and solids to the surface. Second, the well has to be maintained and serviced and kept at optimum conditions during its life. Third, since well fluids are typically a mixture of hydrocarbon oil, gas, water, and in some cases solids, they have to be separated before further treatment. The water is disposed of, and the oil and gas are treated, measured, and then transported via different means to their final destinations or collection points. Hydrocarbon production situations can be different under the same environment or in the same well depending on well fluid conditions which can vary tremendously when the flow regime is changed. Today, in the case of hydrocarbon oil, if the oil is not at the required quality after analysis from a laboratory or from a client's specification, the oil must be stored until it can be brought into specification. The cost of storage in oil tanks and/or crude oil tankers can be very high. The quality control of produced water from a well may require monitoring and control to ensure compliance at all times and maintain a proper history of the fluid before being discharged to the sea. Hydrocarbon gases are typically flared off if they are off-specification, possibly creating an environmental issue.

There are of course known hydrocarbon production systems presently in use, such as gas lift optimization and or multi-flow rate testing, however known methods and systems address the problems only periodically and do not provide continuous monitoring and real time adjustments of parameters as described in the methods and systems of the present invention. What is not found in the known methods and systems are continuous monitoring of the parameters of the produced mixture, optimization of both hydrocarbon oil and gas production, allowing real-time adjustment of a separation unit to be made, and which simultaneously does not generate any waste products that are unacceptable from an environmental standpoint. There is thus a long-felt but as yet unmet need in the hydrocarbon production industry for well production optimization and monitoring, including analyzing phases of oil, gas and water extracted from a hydrocarbon well, and separating the oil, water and gas mixture into oil portions, water portions and gas portions, each respective portion being substantially only oil, substantially only water, or substantially only gas. There is further lacking methods and systems for hydrocarbon production including analyzing the separated oil portion and determining if the separated oil portion meets or exceeds predetermined standards, and treating any separated oil portion that does not meet or exceed the standards to achieve those standards, and transferring the oil portion meeting or exceeding the predetermined standards to a predetermined destination via an economical means without increasing production costs. It would also be advantageous if hydrocarbon production methods and systems could be developed while analyzing the separated water portion to determine if the water portion meets predetermined water standards, and treating any separated water portion that does not meet the standards to achieve those standards. It would further be advantageous to transfer the treated water portion meeting the predetermined standards to an environmentally acceptable destination without the need for storage and expensive disposal. Finally, there has a long-felt but as yet unmet need for hydrocarbon productions methods and systems which are modular.

SUMMARY OF THE INVENTION

In accordance with the present invention methods and systems for hydrocarbon production from wells are provided. As produced from the well the hydrocarbons may be in the form of a mixture of hydrocarbon liquids, hydrocarbon and non-hydrocarbon gases, water, and solids, or components that could precipitate and deposit as solids on processing equipment. More specifically, the mixture may comprise compositions comprising hydrocarbons (including sour hydrocarbons which may include hydrogen sulfide, mercaptans, and other sulfur-containing compounds), water, organic and/or inorganic solids, and may include micelles, macromolecules, globules, resins, asphaltenes, hydrocarbon and aqueous based fluids, drilling muds, frac fluids, and the like having multiple phases (solid, liquid, gas, and any combination thereof). The mixture composition may comprise one or more of each phase. Stated differently, a mixture composition may comprise one or more liquid phases, one or more solid phases, and/or one or more gaseous phases. The methods and systems of the invention measure and, when necessary modify flow conditions of the produced mixture in order to produce hydrocarbons while disposing of any produced water in an environmental friendly and responsive manner and in accordance with environmental laws and regulations. The ability of methods and systems within the invention to treat produced water for disposal allows production from wells that ordinary would not be able to be produced because of their water presence, while avoiding the need and cost of transport boats for polluted water disposal and avoiding the risk of environmental pollution due to leaks transporting the polluted water from oil production facilities (such as rigs) to boats.

A first aspect of the invention are methods of hydrocarbon well production, comprising:

analyzing phases of hydrocarbon oil, gas and water in a mixture at flowing conditions extracted from a hydrocarbon well to determine their relative amounts.

Methods within this aspect of the invention may comprise:

substantially separating the hydrocarbon oil, water and gas of the mixture into hydrocarbon oil portions, water portions and gas portions, each respective portion being substantially only oil, water or gas.

Other methods within the invention may comprise:

analyzing the separated hydrocarbon oil portion and determining if the separated hydrocarbon oil portion meets or exceeds predetermined hydrocarbon oil standards, and treating any separated hydrocarbon oil portion that does not meet or exceed the hydrocarbon oil standards to achieve those standards; and analyzing the separated water portion to determine if the water portion meets or exceeds predetermined water standards and treating any separated water portion that does not meet or exceed the water standards to achieve those standards.

Methods in accordance with this aspect of the invention include those wherein the method operates in a modular manner. In certain methods within the invention each of the first, second, and third analyzing steps occur continuously. In other methods within the invention each of the first, second, and third analyzing steps occur simultaneously with regard to one another. In yet other methods within the invention each of the first, second, and third analyzing steps occurring continuously and simultaneously with regard to one another.

Certain methods within the invention comprise transferring the hydrocarbon oil portion meeting or exceeding the predetermined hydrocarbon oil standards to a predetermined hydrocarbon oil destination, and transferring the treated water portion meeting or exceeding the predetermined water standards to a water destination. The transfer of the hydrocarbon oil also allows mobility of the fluid in the production lines thus creating a lower line pressure within the production system and in cases where wells are out of critical flow can therefore have the effect to increase production due to lower back pressure.

Other methods within the invention comprise injecting one or more chemicals into the mixture after analyzing the phases of the mixture at flowing conditions extracted from the hydrocarbon well and prior to, and/or during the step of substantially separating of the mixture into the hydrocarbon oil, water and gas portions to finally help convert the separated hydrocarbons not in standard to standard conditions Yet other methods of the invention comprise sampling the mixture in order to determine its pressure, volume and temperature characteristics using a PVT analyzer, and to provide a sample to a flow assurance analyzer.

Still other methods within the invention comprise analyzing the separated gas portion to check gas quality and amount predicted by the PVT analyzer.

A second aspect of the invention are modular systems for hydrocarbon production optimization, comprising:

a multiphase analyzer module for analyzing phases of hydrocarbon oil, gas and water of a mixture at flowing conditions extracted from a well;

a separator module for substantially separating the hydrocarbon oil, water and gas from one another into hydrocarbon oil, water and gas portions, the respective portions being substantially only hydrocarbon oil, water or gas;

a hydrocarbon analyzer module for analyzing the separated hydrocarbon oil portion and determines if the hydrocarbon oil portion meets predetermined oil standards, and a treatment module that treats any separated hydrocarbon oil portion not meeting the oil standards to achieve those standards; and a water quality analyzer module for analyzing the water to determine if the water meets or exceeds predetermined water standards and a treatment device that treats any water portion not meeting the water standards to achieve those standards and Systems within the invention include those comprising a PVT flow sampling module for defining of flow parameters at standard conditions, and for providing samples to a flow assurance analysis module for analyzing the mixture for possible solids deposition.

Other systems within the invention include those comprising a flow heating module for heating the mixture, when needed, to increase temperature of the mixture to improve separation efficiency of the separator module.

Yet other systems within the invention comprise a chemical injection module for injecting one or more chemicals into the mixture to modify mixture flow qualities in a defined and optimized variable flow treatment area inside the well and in combination with the treatment module and the flow heating module in order to maximize separation efficiency of the separator module and reduce the possibility of the separated three phases not meeting their respective standards.

Still other systems within the invention comprise a gas analyzer for gas quality check process control.

As used in herein, the phrase "substantially separating the hydrocarbon oil, water and gas of the mixture" means that while it is virtually impossible to completely separate hydrocarbons from water (for example there may be azeotropes or unbreakable emulsions), the methods and systems of the invention are designed to optimize the separation efficiency, by using one or more of gravity settling, heat, chemical additives, voltage using electrical grids, and the like as is known in crude oil desalting operations. The phase "meets or exceeds predetermined hydrocarbon oil standards" means the hydrocarbon oil has chemical and physical characteristics acceptable for crude oil refining. What is acceptable for crude oil refining may differ from country to country, region to region, or indeed within a crude oil refinery, depending on such parameters as the time of the year, geographic location of the refinery, customer requirements, laws and regulations, and the like. Standards settling organizations, such as the American Petroleum Institute (API) may also have standards for determining when hydrocarbon oil meets or exceeds predetermined hydrocarbon oil standards. Similarly, the phrase "meets or exceeds predetermined water standards" means the water has chemical and physical characteristics acceptable for disposal in a body of water, for example a sea, ocean, lake, loch, and the like. What is acceptable for water disposal may differ from country to country, region to region, or indeed within a crude oil production facility, depending on such parameters as the time of the year, geographic location of the production facility, customer requirements, laws and regulations, and the like. Standards settling organizations, such as the American Petroleum Institute (API) may also have standards for determining when hydrocarbon oil meets or exceeds predetermined hydrocarbon oil standards.

As used herein the term "treating" means that the hydrocarbon oil or water, as the case may be, is exposed to conditions that bring the oil or water into an acceptable condition. "Treating" may include exposing the oil or water to chemical, physical, mechanical, and other conditions, or combination thereof, allowing the oil or water to meet or exceed the qualifications set by a customer, law, or both.

Apparatus and methods of the invention will become more apparent upon review of the detailed description of the invention and the claims that follow.

BRIEF DESCRIPTION OF THE DRAWINGS

The manner in which the objectives of the invention and other desirable characteristics may be obtained is explained in the following description and attached drawing in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims, the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention. However, when applied to equipment and methods for use in wells that are deviated or horizontal, such terms may refer to a left to right, right to left, or other relationship as appropriate.

Method and systems embodiments of the present invention pertain to production from hydrocarbon-bearing wells and the corresponding techniques for extracting and processing the contents thereof. First, a mixture comprising hydrocarbon oil and gas, water, solids, and the like is brought to the surface. Second, service is maintained to keep the well at optimum conditions during its life. Third, since well fluids are a mixture, they are separated before further treatment. The water is disposed of in an environmentally acceptable manner, and the oil and gas are treated, measured, and then transported via different means to their respective final destinations or collection points.

Certain method and system embodiments of the present invention apply to the second and third stages simultaneously and comprise measuring and modifying flow conditions in order to optimize production conditions and also to optimize the separation process and disposal of the produced water in an environmental friendly and responsible manner that follows environmental laws and regulations.

Figure 1:
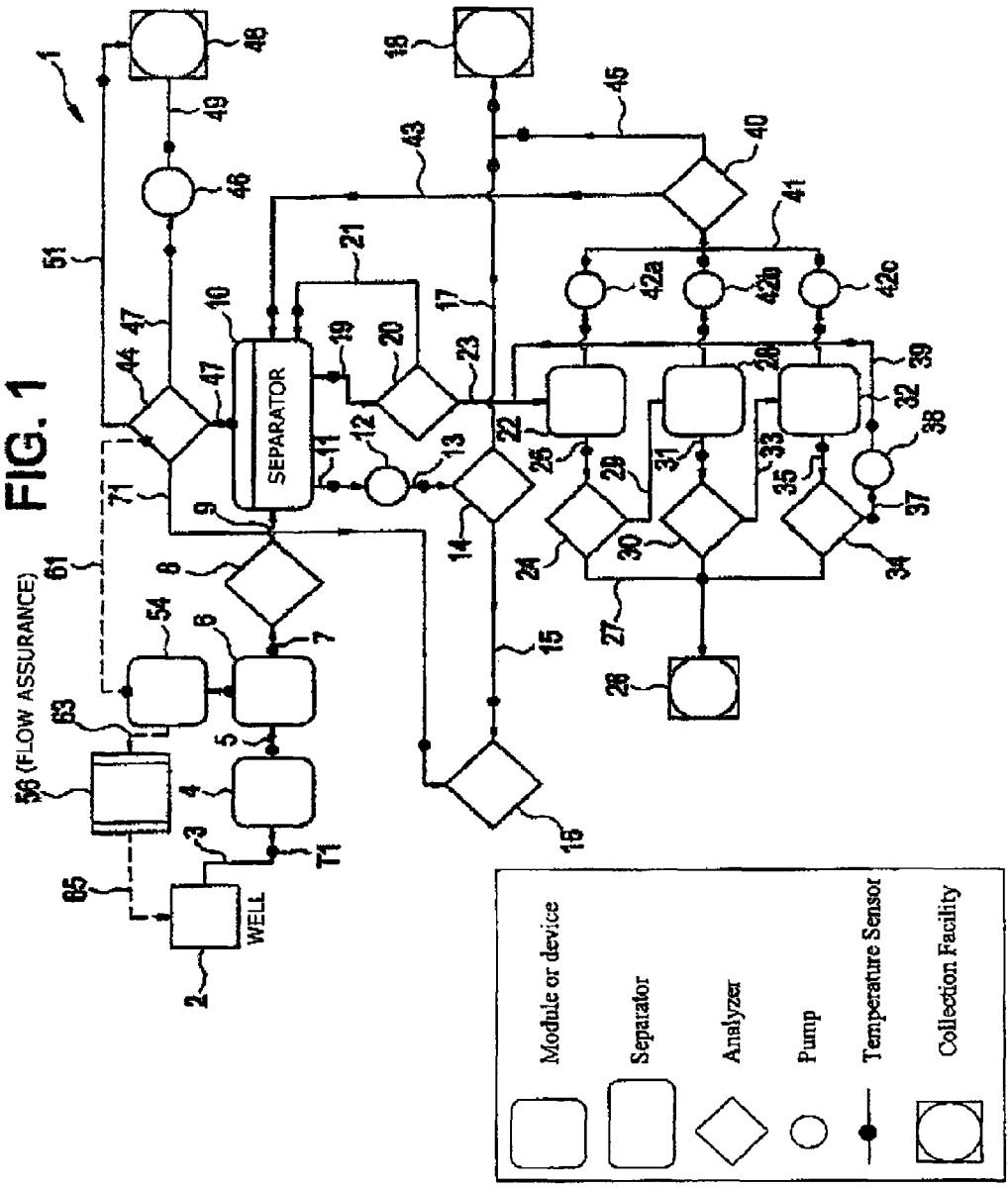
FIG. 1 is a schematic process flow diagram illustrating various features of methods and systems of the invention.

Referring now to the drawings figures, FIG. 1 is a schematic flow diagram illustrating an embodiment 1 of methods and systems of the invention. A mixture comprising hydrocarbons, produced water, solids, and the like is produced from a well 2 and routed via a conduit 3 to a heating module 4, which may or may not be in service depending on the mixture characteristics. The mixture or a portion thereof then is routed through a conduit 5 to a multiphase testing module 6, where the amount of each phase (liquid, gas, solid) is measured. The mixture or a portion thereof is then passed via conduit 7 to an analyzer module 8 to measure parameters that might indicate that chemical addition may be necessary. Parameters such as pH, salt content, specific gravity, and the like may be measured. Other parameters will be apparent to those of ordinary skill in the hydrocarbon processing art. The mixture then passes via a conduit 9 to a separator module 10, which may include one or more vessels (only one is indicated in FIG. 1).

Temperature of the various streams may be measured by temperature sensors, indicated in FIG. 1 by small dots in the conduits. One temperature sensor, designated as $T_1$ in conduit 3, measures temperature of the produced mixture as it reaches the surface and prior to entering heating module 4. Other temperature sensors may be placed downhole in well 2, as is known in the hydrocarbon production art, to monitor temperature of various locations in the well or reservoir it is producing from. The various temperatures may be monitored locally and/or remotely in a centralized location, such as an operator or customer location. Temperatures, flow rates, multiphase data, produced mixture characteristics, and the like, may all be communicated via wire or wireless communication to these location as desired.

Referring again to FIG. 1, the hydrocarbon oil, having been substantially separated from the other constituents of the mixture by separator module 10, is routed via conduit 11, a pump 12, and conduit 13 to an oil quality analyzer module 13. If the hydrocarbon oil does not meet or exceed specifications designated by the operator, it may be flared off by routing through a conduit 15 to a flare 16. If the hydrocarbon oil does meet or exceed specifications, the oil may be routed via a conduit 17 to a collection facility 18, which may be a pipeline, ocean-going vessel, one or more tanks, and the like.

Produced water, and any water that may have been added to the produced mixture, is routed from separator module 10 via a conduit 19 to a first water analyzer module 20 (only a portion of the water need pass through the analyzer). The first water analyzer 20 determines if the separated water has less than about 2 percent oil; if there is too much oil present, the water is returned to separator unit 10 via a conduit 21. If the oil content is below about 2 percent, the water is routed via a conduit 23 to an on-site water treatment plant comprising a water de-oiling module 22, water polishing module 28, and gravity tankage 32. The water de-oiling module may comprise any known media for de-oiling water, such as one or more sand filters, cyclone separators, and the like. Water separated from oil in de-oiling module 22 may then pass (or a portion thereof may pass) through a second water quality analyzer module 24, which checks to see if de-oiled water from module 22 meets or exceeds specifications for disposal in the local watershed. If the water is acceptable it is routed through conduit 27 for disposal in a main water conduit 26, and passed to the ocean or other water body.

If the water separated in de-oiling module 22 is not acceptable, the de-oiled water is routed through a conduit 29 to a second water treatment module 28, such as a water polishing module. Water polishing modules are known in various arts, and may comprise ion exchange resins, for example. Again the water quality is checked by routing the polished water, or a portion thereof, through a conduit 31 to a third water quality analyzer 30, and analyzed to determine if polished water from water polishing module 28 meets or exceeds specifications for disposal in the local watershed. If the polished water is acceptable it is routed through conduit 27 for disposal in a main water conduit 26, and passed to the ocean or other water body.

If the water separated in water polishing module 28 is not acceptable, the polished water is routed through a conduit 33 to a third water treatment module 32, such as one or more gravity tanks. Again the water quality is checked by routing the gravity settled water, or a portion thereof through a conduit 35 to a fourth water quality analyzer 34, and analyzed to determine if water from gravity tankage module 32 meets or exceeds specifications for disposal in the local watershed. If the gravity-settled water is acceptable it is routed through conduit 27 for disposal in a main water conduit 26, and passed to the ocean or other water body. If the gravity-settled water is still not acceptable for disposal it may be routed back to water de-oiling module 22 via conduit 37, pump 38, and conduit 39.

Hydrocarbon oil separated in de-oiling module 22 may be routed to a testing module 40 by a conduit 41 and pump 42a to determine if it meets or exceeds specifications desired, and if it does, routed via a conduit 45 to a pipeline tankage, or other oil collection module 18. Similarly, hydrocarbon oil separated in water polishing module 28 and gravity tankage 32 may be routed to the oil testing module 40 by separate conduits and pumps 42b and 42c, respectively to determine if the meet or exceed specifications desired, and if it does, routed via a conduit 45 to a pipeline tankage, or other oil collection module 18. If the separated oil does not meet or exceed specification it may be routed to separator 10 via conduit 43.

A water treatment plant incorporating the above noted features allows: (a) production from wells that would otherwise not be viable because of a presence of water; (b) avoidance of a need for, and cost of, transporting boats for transporting/disposal of polluted water; and (c) avoidance of a risk of environmental pollution due to leaks associated with transporting the polluted water from an oil rig or other production facility to the boats.

Oil separated from separator 10 may be routed via a conduit 11, pump 12, and conduit 13 to an oil analyzer module 14 for testing to determine of the oil meets or exceeds standards demanded by the operator or purchaser of the oil. If the oil does meet or exceed the standards it may then be routed via conduit 17 to oil collection facility 18, but if it does not meet or exceed the standards, the oil may be routed to flare system 16.

Substantially all gas in the effluent mixture is separated from the mixture in separator 10 and routed via a conduit 47 to a gas analyzer 44. If the gas does not meet fuel gas specifications or other predetermined specifications, it may be routed to a flare system 16 via conduit 71. However, if the gas does meet specifications it may be either routed directly to a gas collection facility 48 via a conduit 51, or routed via conduit 47 to a compression module 46 for energy booting before being routed through conduit 49 to gas collection facility 48.

Gas analyzer 44 may also help control pressure of the system, in particular pressure in the separator 10, via a control connection 61, by serving as a check on a PVT active sampling device 54. Flow assurance module 56 may also be used to monitor effluent mixture through a sample connection 65 to determine the likelihood of solids deposition from such materials as asphaltenes and the like.

Figure 2:
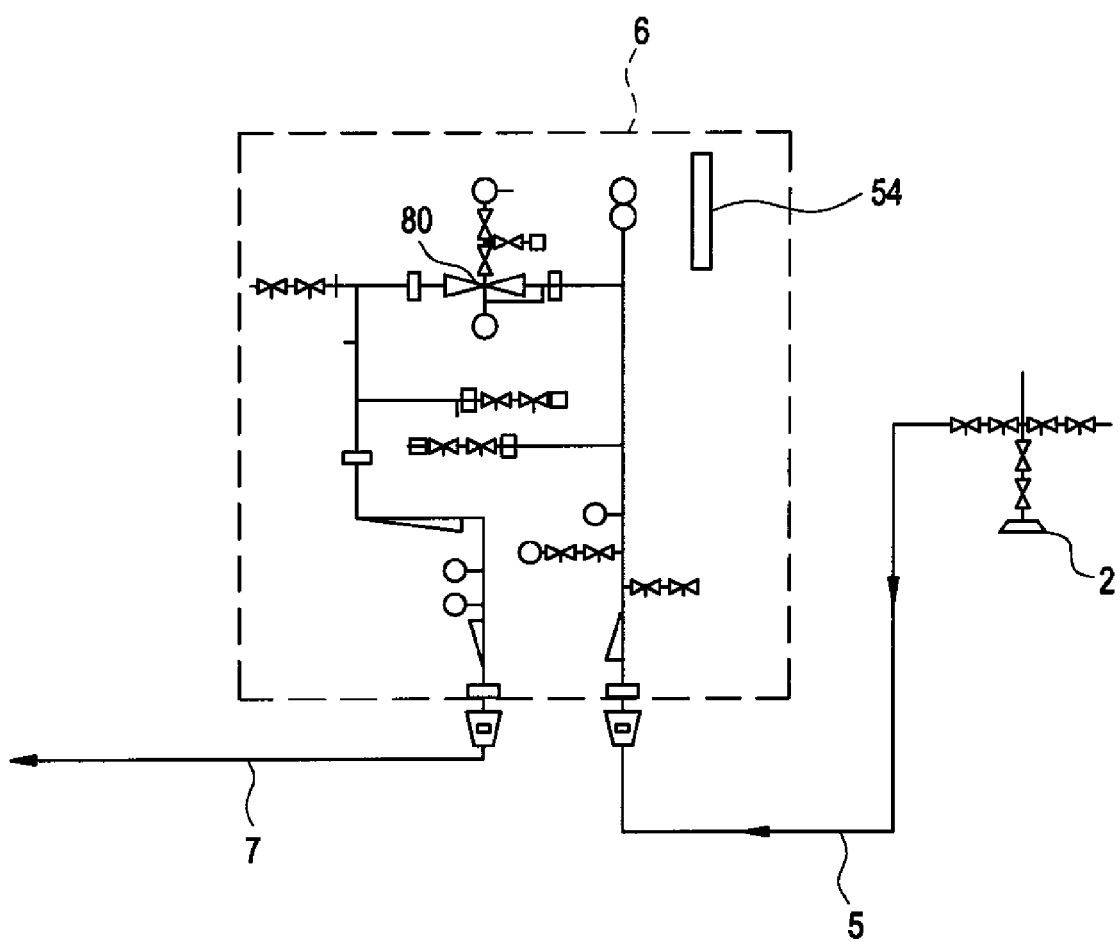
FIG. 2 is a schematic diagram of a multiphase testing module useful in methods and systems of the invention.

Referring now to FIGS. 2-6, more features of methods and systems of the invention may be seen. FIG. 2 illustrates one multiphase testing module 6 useful in methods and systems of the invention, in this embodiment employing a venturi 80 to create a low pressure region in order to allow measurement of the total volume or mass of effluent entering the system without the need for any separation of the mixture. An active sampling device 54 may be used to conduct PVT analysis of the effluent mixture. The multiphase testing module 6 measures the flow in real time and may have a scanning rate on the order of 10 to 1000 Hz, more particularly from about 10 to about 100 HZ. A scanning rate of 45 Hz may be employed. The results may be transmitted via wire or wireless telemetry to a location such as an operator's or client's office for constant monitoring of the flow rates and early detection of production decline.

The quality of the oil and gas is monitored using the active sampling device 54 so as to determine the composition of the oil and gas and ensure that they are in line with production standards or requirements. The active sampling device 54 also acts as a quality check since it performs analysis at line conditions and is able to determine the correct parameters from line condition to standard conditions (for example Bo is an oil correction factor, Bg a gas correction factor, and Bw a water correction factor) so as to provide proper data calculation from line conditions to standard conditions. If upon analysis it is detected that the gas may contain impurities that may contaminate the production it may then optionally be diverted to the ecological flaring system through a conduit 71 as illustrated in FIG. 1 to be burned, and continuous analysis may be used to monitor the gas flow in order to define when gas could return to normal production conditions without the need of flaring.

Figure 3:
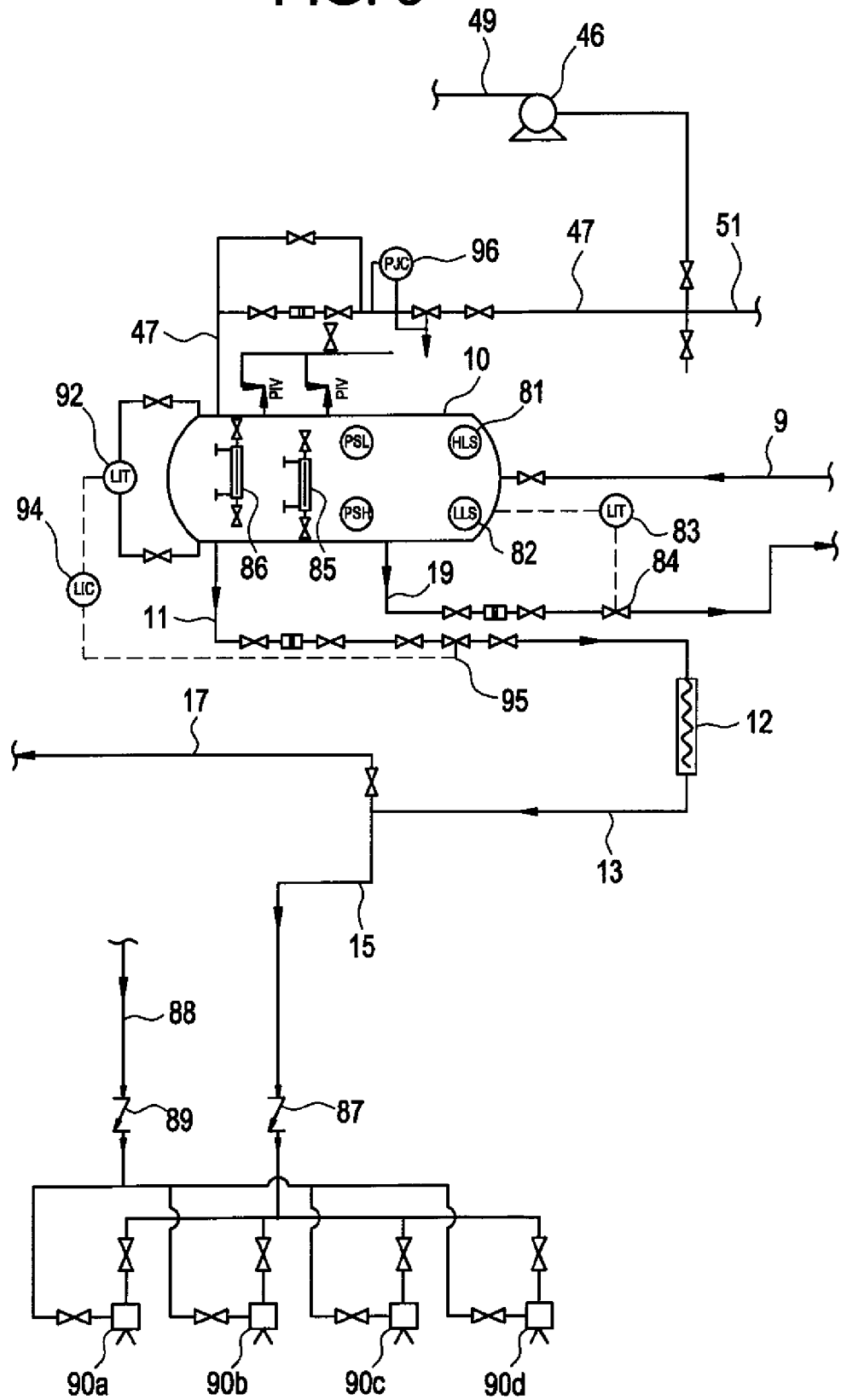
FIG. 3 is a schematic process flow diagram of one embodiment of a separator module and flare system suitable for use in methods and systems of the invention.

Referring to FIG. 3, after testing by multiphase testing module 6, the effluent mixture is then passed to the phase separator 10 via conduit 9 where the effluent mixture is separated and the oil and gas are measured for quality to see if up to standards. Separated hydrocarbon oil is routed via conduit 11, pump 12, conduits 13 and, if it meets or exceeds specifications, through conduit 17 to oil collection facility. If the oil does not meet or exceed specification it is routed via conduit 15 to flare system burners 90 (four burners are illustrated 90a, 90b, 90c, and 90d). Methods and systems of the invention may use from one to 20 burners, or more if necessary. Compressed air is supplied via a conduit 88. Check valves 87 and 89 in oil and compressed air conduits, respectively, may be provided for safety. Oil flows from separator 10 under control of a level indicating controller 92, 94, via a control valve 95. Another level indicating controller 83, 84 is used for controlling transfer of separated water. Separator 10 may include a high level alarm 81 and a low level alarm 82, as well as a water sight glass 85 and an oil sight glass 86. A back pressure controller 96 maintains pressure on separator 10.

Figure 4:
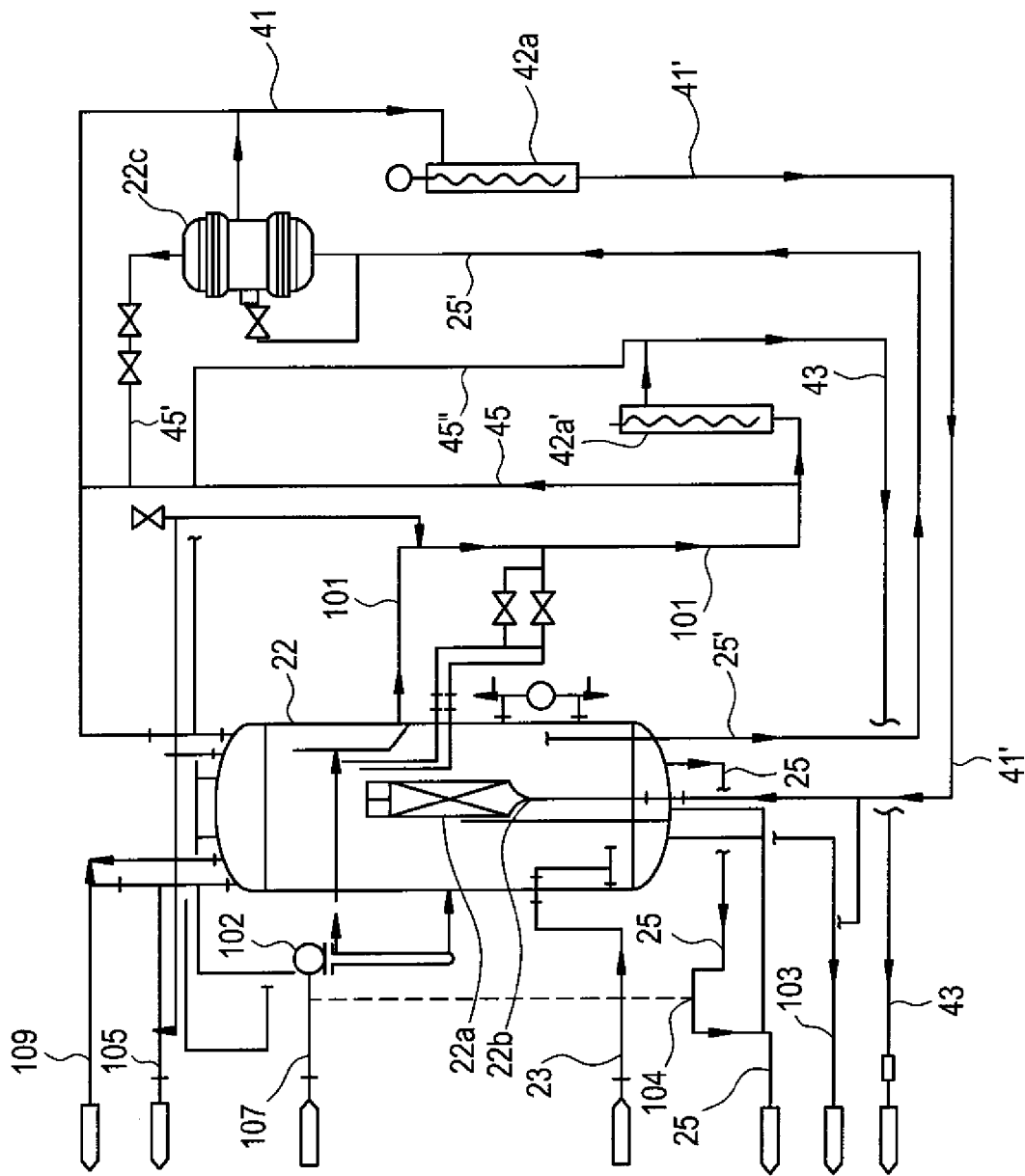
FIG. 4 is a schematic process flow diagram of one embodiment of a cyclone separator module suitable for use in methods and systems of the invention.

A first module of a water treatment plant is illustrated in FIG. 4, which illustrates the water de-oiling module 22, which in this embodiment is a de-oiler cyclone. De-oiler cyclones are driven by inlet water pressure and utilize a pressure drop across the cyclone to provide the energy or driving force to cause oil-water separation. Normally, system pressure is used to provide the driving pressure, but if too low (<60 psi/4 Bar), a pump can be used to boost the feed pressure. Typically, single stage centrifugal pumps are used, where pressures are too low. A suitable de-oiling cyclone is that known under the trade designation CYCLONIXX®, produced by Process Group, Victoria, Australia, which includes a tangential inlet section where the water enters through conduit 23, and is forced to spin rapidly, generating high centripetal forces. These forces, combined with the tapering shape of the internal profile, accelerate the spinning. This effectively forces the water away from the centre axis to the outer walls of module 22, and forces the lower density oil to the central core 22a that forms along the axis of the de-oiler cyclone. The water spirals down the tapered section of the cyclone and exits via the clean water outlet nozzle and conduit 25. The central oil core is forced in the reverse direction by back-pressure on the water outlet, for example caused by level indicating controller 102 and its associated control valve 104. An instrument air connection is illustrated at 107.

Figure 5:
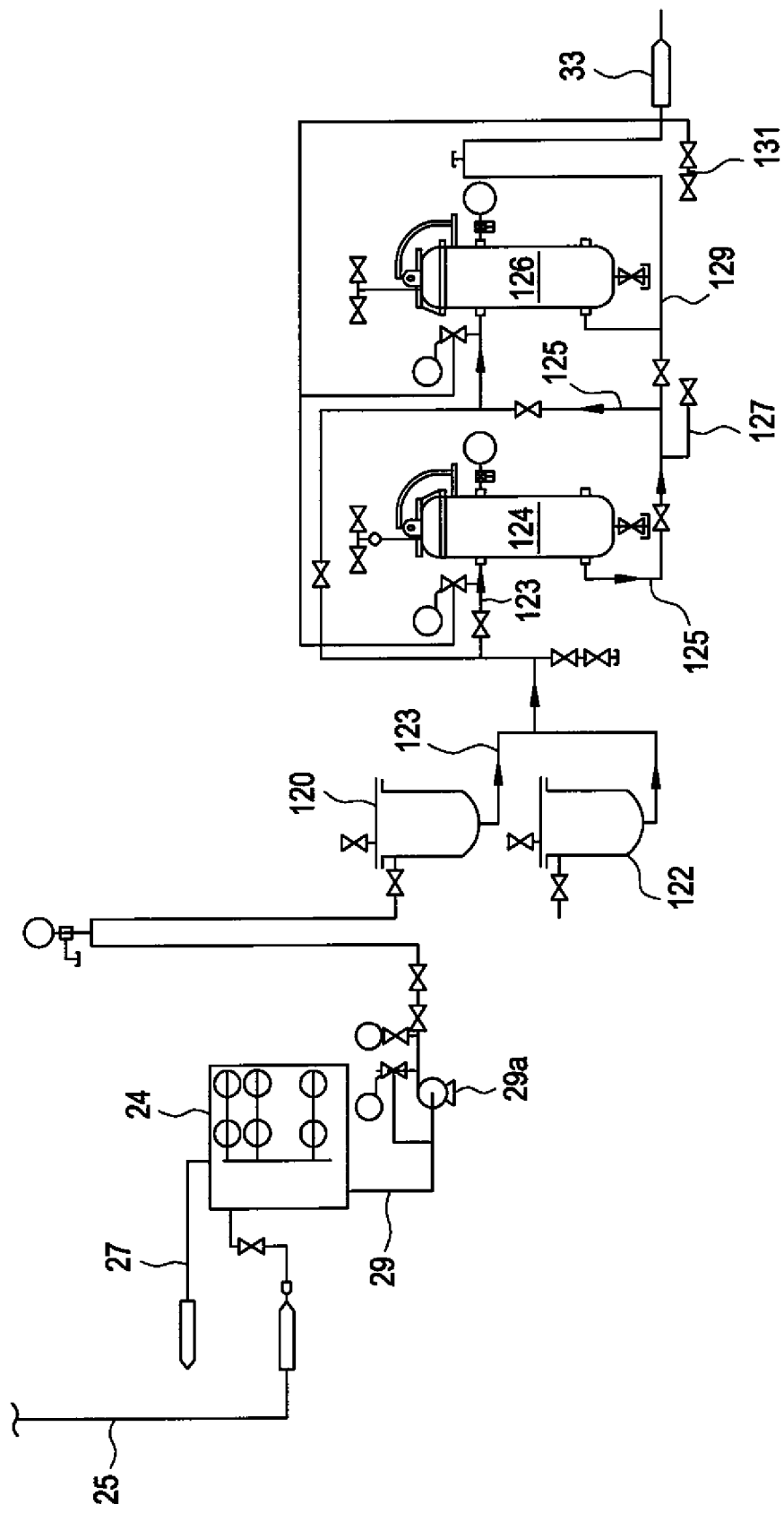
FIG. 5 is a schematic process flow diagram of one embodiment of a water polishing module suitable for use in methods and systems of the invention.

In FIG. 4, conduit 109 and 105 are safety relief valves of the equipment to be vented to a safe area. Conduit 107 supplies the air supply at 150 psi for all instrumentation. Conduit 23 is the inlet of the module that enters the water to be treated and conditioned for disposal. Conduit 25 is used to dispose of the water overboard if it complies with client or governmental standards or continued to conduit 24 as illustrated in FIG. 5. Conduit 103 routes the recuperated oil from the system to be re-injected either into a production line or the oil outlet of module 22 as secondary recovery process. A secondary oily water stream may exit module 22 via a conduit 25'. The secondary oily water stream may flow to an optional coalescer 22c used to help increase separation of oil droplets in the water so as to increase module 22 efficiency after which is then sent through conduit 41' to hydrocyclone 22a via pump 42a and through an orifice 22b. Flow is largely controlled by this orifice size, but can also be regulated by a control valve, and may be set to allow a flow at 2-4 percent of the inlet flow. The oil reject is routed via conduit 101 and oil reject pressure may be boosted by a pump 42a' before being routed out of the de-oiling module through conduit 43. Conduits 45, 45', and 45" are pressure relief conduits.

Gravitational forces generated within de-oiler hydrocyclone 22a are very high, and therefore these de-oiler cyclones may be installed vertically, horizontally or on moving structures. Some of the important factors involved in the process design and selection of a de-oiler cyclone are available pressure/pressure drop, oil droplet size and distribution, liquid viscosity/temperature, and cyclone diameter and required oil recovery. It is usually preferred to utilize the full system pressure to drive de-oiler cyclone to maximize oil recovery and throughput. The preferred site to locate cyclones in a process is on the water outlet line from the separator, upstream of a level control valves. This usually provides the highest capacity with minimal droplet shearing. The operating pressures for the de-oiling cyclones known under the trade designation CYCLONIXX® Deoiler Cyclone are defined by the pressure differential ratio (PDR). The PDR is defined as:

$$PDR = \frac{P.\text{INLET} - P.\text{REJECT}}{P.\text{INLET} - P.\text{OUTLET}}$$

Where:
P.Inlet=Pressure at inlet of Deoiler Cyclone,
P.Reject=Pressure of Reject oil stream outlet,
P.Outlet=Pressure of Water Outlet stream.
PDR should be maintained in the range of 1.7-1.8.

Figure 6:
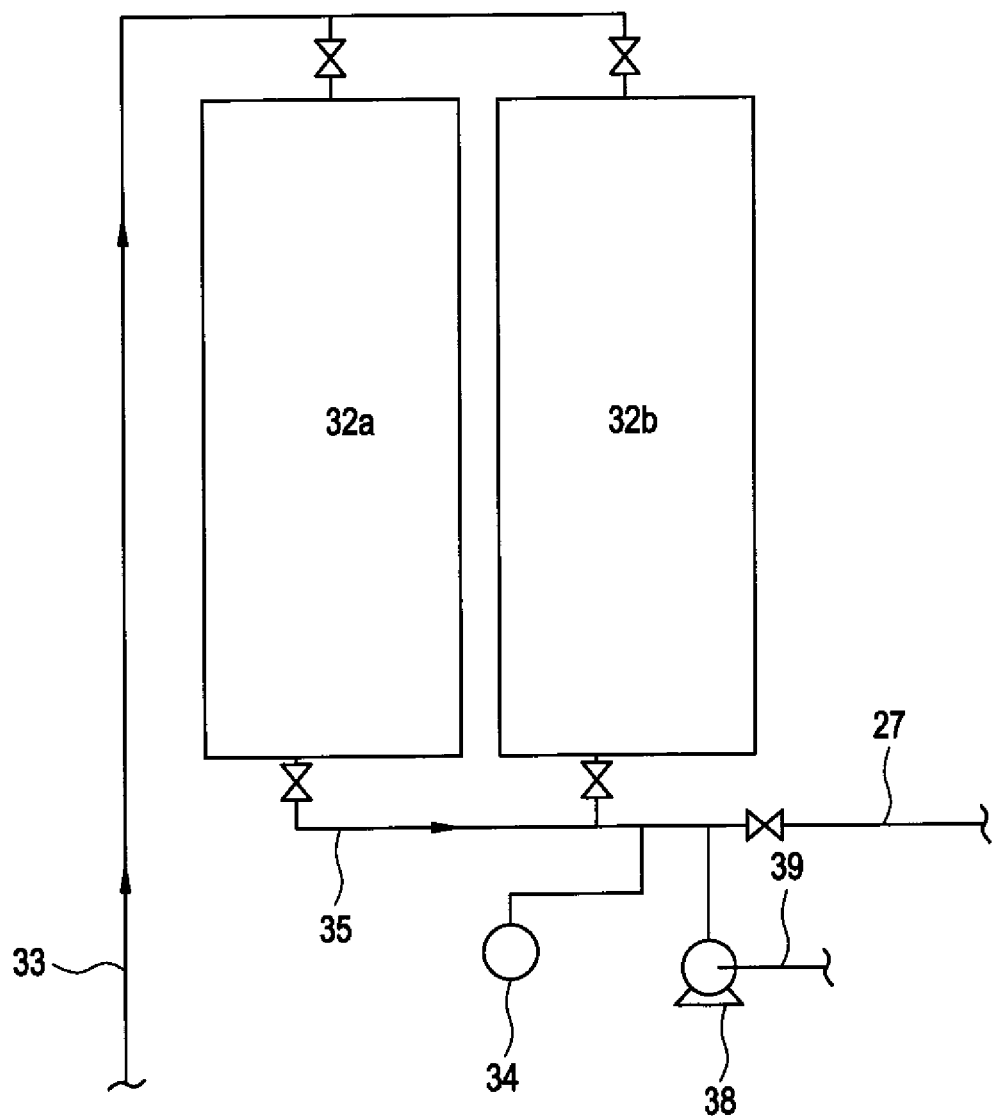
FIG. 6 is a schematic process flow diagram of a gravity tankage module suitable for use in methods and systems of the invention.

De-oiled water from de-oiling module 22 exits de-oiling module via conduit 25 and is analyzed by a second water analyzer 24 (FIG. 5). If the de-oiled water does not meet or exceed specifications it is routed via conduit 29 and, if necessary, a booster pump 29a, to a water polishing module comprising inlet filtration units 120, 122, conduit 123, and polishing media modules 124 and 125; the latter may be arranged in series or parallel flow arrangement. Conduit 123 feed the initially filtered, de-oiled water to module 124, and conduit 125 feed the product water of module 124 to another module 126 through conduit 125. A sample may be taken via a sample connection 127. If the water does not meet or exceed specification it is continued to be routed in conduit 125 to second module 126 (more or less than two modules maybe employed); if the water as tested at sample connection 131 still does meet or exceed specifications, it may be routed via conduit 33 to gravity settling tankage 32a and 32b (FIG. 6). After gravity settling, the water is flowed through conduit 35 and tested by another water analyzer 34. If the water meets or exceeds specifications for local disposal, it is routed through conduit 27 to the ocean or other reservoir 26 (FIG. 1). However, if the water still does not meet or exceed specifications, it may be recycled back to water de-oiling unit 22 via a pump 38 and conduit 39.

In certain embodiments it is advantageous to continuously monitor and adjust production, e.g., in gas lift optimization or multi-flow rate test. For example, an embodiment of the present invention optimizes both oil and gas production, allows constant monitoring of the system modules, allows adjustments to be made in real time, and simultaneously generates acceptable waste products, since the integrated system can safely dispose of them.

A hydrocarbon well generally needs to be tested in order to decide if it can be put into production phase. The methods and systems described herein may be used in both testing and production phases in order to:

a) minimize the time and cost and increase accuracy of the testing phase, for a portion of or the entire life of the well production phase, with accurate measurements of the main properties of the tested flow at various flow regimes, while defining critical parameters for the design of the production regime; and b) operate the production phase using several sub-systems or modules, measuring and modifying flow conditions to maximize oil production, and operate the separation system modules and the disposal of the produced water in an environmentally friendly and responsive manner while meeting or exceeding environmental laws and regulations.

Within the production phase, the methods and systems of the invention aim to improve hydrocarbon oil and gas production using measurements, monitoring and transportation of the hydrocarbons to their final destinations, and in certain embodiments use modular sub-systems and methods, depending on different production situations and environments. A production situation can be different under the same environmental conditions if the well effluent mixture is variable in composition, temperature, pressure, and the like. Well fluid conditions can vary tremendously if the flow regime is changed. The methods and systems of the invention are based on some or all of the following sub-systems, each of which may be modular:

a) a high efficiency and environmentally friendly four phase separation module (the four phases being one phase comprising substantially hydrocarbon oil, a second phase comprising substantially hydrocarbon gas or vapor, a third phase comprising substantially water, and a fourth phase comprising substantially solids), which includes accurate mass flow measurement analyzers; does not require calibration tanks in order to reduce environmental impact and facilitate phase separation in limited space (such as on off-shore hydrocarbon production platforms, for example); and which can ensure continuous separation of gas, oil, water and solids based on different physical parameters of the phases, such as densities, and adapt itself to the dynamic conditions of the various production conditions, from early clean-ups in the testing phase to stable late stage production;

b) a water treatment plant, that as described herein allows the disposal of the produced water in an environmentally friendly and responsive manner while meeting or exceeding environmental laws and regulations and also allows: production from wells that would otherwise not be able to produce because of water presence; avoidance of the need for, and cost of, transport boats for polluted water disposal; and avoidance of the risk of environmental pollution due to leaks associated with transporting the polluted water from off-shore hydrocarbon production platforms (and the like) to the boats;

c) an ecologically acceptable flaring system and method, which allows production quality check and ecologically acceptable disposal before the production flow is sent into production pipelines. In order to improve separation process efficiency and to increase fluid energy, both for the ecologically acceptable flaring and for transportation into the oil production pipeline, a pumping or boosting stage may be included;

d) a gas quality check and compression module, in order to increase separation module efficiency and ensure quality control before gas is sent into gas production pipelines;

e) a multiphase flow measurement module, which allows continuous rate measurement of individual phases in a well without prior separation;

f) flow quality check module after the multiphase measurement module;

g) flow heating module, used, when needed, to increase temperature of the effluent mixture flow to improve separation efficiency;

h) chemical injection module to modify flow qualities in a defined and optimized variable flow treatment region inside the well, and, working in combination with the flow treatment module and the flow heating module in order to maximize full separation process efficiency;

i) a PVT flow sampling module, which allows flow assurance analysis and gas quality check process control and defining of flow parameters at standard conditions. The PVT flow sampling module may use mercury-free technology to reduce health, safety and environmental risks associated and should allow: early fluid analysis for Pressure-Volume-Temperature (PVT) data collection with delivery of high quality PVT results within a reasonable time; production of a comprehensive fluid analysis report with a small amount of single-phase reservoir fluid; and provide onsite reservoir fluid sample quality validation; and j) one or more temperature monitoring modules, in particular on one or more streams flowing into and out of the various modules, in order to monitor the flow, temperature, and other parameters, and evaluate module and process efficiency and any possible further process change in order to improve efficiency.

The flow assurance analysis module should define, with a multidiscipline process involving sampling, laboratory analysis, and production engineering, the phase behavior and physical properties of the waxes and asphaltenes (principle causes of flow assurance problems) to ensure uninterrupted production with a modeling study to build thermodynamic fluid models to validate the experimental wax and asphaltene measurements and establish the pressure, temperature and gas-liquid-ratio (GOR) regimes where these solids will impact the field production management. Oil field flow assurance characterizes the operability and reliability of hydrocarbon oil and/or gas production systems. Organic and inorganic solids (wax, asphaltenes, hydrates, scale, and the like) precipitation, deposition, emulsion, foaming, corrosion, erosion, inhibition, rheology, and complex multi-phase flow are some of the key issues related to flow assurance. Many flow problems are due to hydrates, wax, asphaltene and scale precipitation, which may lead to deposition on internal pipe and other equipment surfaces, causing pressure reduction, slower production, and ultimately plugging. Moreover, elevated viscosity at low temperatures (gelling) represents potential rheological problems, which may lead to slugging. Schlumberger has used the system known as the Organic Solids Deposition and Control system (OSDC), described more fully in U.S. Pat. Nos. 6,959,588 and 7,150,183, to identify, produce and control both wax and asphaltene deposits at very realistic reservoir as well as transport conditions. The experimental results using the system known as OSDC were benchmarked against field data and were found to be conservative, yet superior when compared to any other methods such as flow loops, cold finger and stirring tanks. Feedback from major oil companies was very encouraging. The experimental data from live oils, which are expensive to sample, are invaluable. Despite success of the apparatus known under the trade designation OSDC, the system has numerous limitations in terms of being capable to meet the fast-growing and continuously evolving market. The high cost of the live oil sample collection and its uniqueness make it challenging and crucial for the industry to minimize the risks of not only losing the sample, but most importantly to extract the maximum information possible from it. Better controllability, more powerful hardware, improved design and enhanced geometry were desired to achieve ideal data quality and greater profitability.

Despite success of Schlumberger's apparatus known under the trade designation OSDC, the system has numerous limitations in terms of being capable to meet the fast-growing and continuously evolving market. Flow assurance modules described in assignee's Ser. No. 11/674,700 filed Feb. 14, 2007 (now U.S. Pat. No. 7,523,648) address one or more of the following limitations of the OSDC: non-adaptability (limited scalability to mimic available pipelines, non-transferable to field or downhole, and fixed, single-type deposition surface incapable of multi-surface deposit buildup); single phase process only; static and non-refreshed processed oil sample (no fresh feed or feed-through); bulky geometry; limitation to wax and asphaltene deposition performance, with high conservatism for asphaltene deposition (not appropriate for scales, hydrates, and heavy oil); limited heat balance process system; limited heater heat transfer performance; extreme heat loss; slow heat transfer; limited torque; inability of detecting and monitoring any deposition buildup; high depletion aspect ratio factor; conservative output; weak collection procedure of processed sample for analytical work; inability of processing sample quantification through good mass balance; no co-deposition performance; no commingling performance; crude injection process, requiring chemicals, one or more pressurized gases, or other fluids.

In order to address these problems, the flow assurance module invented as described in U.S. Pat. No. 7,523,648, comprising an internal and an external cylinder positioned between first and second end portions, at least one of which is rotatable and thus forming a Couette-Taylor device, the internal cylinder having an exterior surface, the external cylinder having an internal surface, an annular sample flow-through chamber or cell formed between the surfaces, optionally the chamber having a variable volume, the device having a sample inlet and outlet; and a non-intrusive probe for detecting solids deposition on at least one of the surfaces during sample flow through the apparatus. Exemplary non-intrusive probes include acoustic probes, thermal probes, and the like. The deposition surface or surfaces may be removed from these apparatus, and the apparatus are capable of evaluating samples at temperatures ranging from −40° C. or less up to 250° C. or greater, and pressure ranging from partial vacuum up to 100 MPa, while at unlimited high shear conditions. Certain apparatus may have adaptable flow-through chamber geometry, meaning that the sample flow through chamber may be modified in volume and shape, either offline, or, more importantly online during testing. The volume of the flow-through chamber may be changed, for example, by changing radius of the inner cylinder (sometimes referred to herein as a spindle), changing radius of the outer cylinder, or both. In certain embodiments, only a portion of the flow-through chamber may be variable in volume and/or shape. In other apparatus within the invention, the internal and external cylinders, as well as any other component exposed to a sample, may be $H_2S$ compatible. Suitable apparatus include those comprising a flow meter and flow controller affording the operator the option of producing a variable or continuous flow condition, while varying one or more other independent influencing variables, including but not limited to, temperature, pressure, shear, surface type, surface roughness, chemical composition, such as inclusion of inhibitors and chemical inducers (for example water, solvents, and the like). Certain apparatus may include one or more chemical injection nozzles, attached to pumps and reservoirs of various fluids that may be added to the virgin sample flowing through the chamber. Apparatus may include nozzles for injection of gases, liquids, slurries, emulsions, and solids in the form of solutions. Certain apparatus are capable of performing solids deposition monitoring and analysis at any flow regime including multiphase flow (gas-liquid-solid). Certain apparatus may include an external cylinder having an internal surface, exposed to the flowing sample, which has two or more surface types and surface roughness. Other apparatus may include a removable solids deposition surface. Apparatus may be outfitted with connections allowing the apparatus to be fastened to a completion tool or other downhole tool, or pipe or tubing, such as coiled tubing. Certain embodiments may be suitable for use on a working hydrocarbon oil or gas rig. Apparatus may include a variable torque motor for varying the torque of the rotating cylinder (interior or exterior, or both through suitable gearing), allowing apparatus to investigate solids deposits from heavy hydrocarbon oils, hydrates, and other high viscosity compositions.

Certain apparatus may comprise thermal energy supply able to transfer heat faster to the flow-through chamber than previously known apparatus, while improving insulation to avoid heat losses. Apparatus may exhibit reduced depletion effect due to mass balance, while the flow-through design allows the apparatus to mimic actual production piping. Certain apparatus may include one or more sub-components for detection and quantification of precipitates in the sample chamber. Suitable sub-components for detection an quantification of precipitates include, but are not limited to detectors based on optical methods, acoustic methods, ultrasonic methods, visual methods, and the like. Suitable apparatus may analyze single and multi-phase flowing samples, and certain apparatus may analyze flowing samples depositing one or more solids (mono- and co-deposition), wherein the co-deposition may be layered (one deposit overlapping another deposit) or non-layered (one deposit in one surface location and another deposit in a different surface location). Apparatus may also simulate commingled fluids through the provision of suitable nozzles, pumps, and other and flow connections.

The methods and systems of the invention aim to maximize production of oil and gas, and dispose of produced water, from a hydrocarbon producer well, with one or more measurements, heating, phase separation, chemical injection, monitoring, flaring, fluid treatments, energy boosting of the treated flows and transportation of the hydrocarbons to a final destination, and in certain embodiments aim to maximize the production of oil and gas and dispose of produced water in a modular way, depending on different water and hydrocarbon production situations and environments. Relating to those goals, the well effluent fluid is initially flowed to the multiphase meter (FIG. 1) where phases, e.g., all the phases, are measured without separation and at actual line conditions. Samples may be taken at the meter using an ASD sampling so as to validate line conditions and behavior at the actual pressure and ensure that the conversion factors from line conditions to standard conditions are validated and correct. Depending on the fluid type, e.g., if too viscous or heavy, emulsions may be encountered and the intervention of chemicals may be needed to help with ease of fluidity and separation. The chemicals may be injected in the well down hole using a tube at the required dose in order to use the same well as flow treatment area and ensure proper distribution of the chemical within the effluent to achieve the required effect. Upon the effluent entering the separator (FIG. 3) the effluent is substantially separated into oil, water, and gas phases. If the oil is not at the required quality after analysis from the PVT express laboratory and from client's specification, the oil is pumped using a transfer pump so as to reenergize the fluid and flared off using the ecological burner system until conditions and specifications are met. Once specifications are met, the transfer pump then transfers the oil directly from the separator oil outlet to the production line to the final destination and avoids the cost of storage and costly needs for crude tankers. The separated water, once within condition below 2 percent of oil in water, is sent to the water de-oiling unit (WDOU) (FIG. 4), to the water polishing unit (WPU) (FIG. 5), and eventually to gravity tanks (FIG. 6) where the water is conditioned and returned to the sea according to local environmental law, while monitoring temperature, oil in water, solids in suspension, sulfur-containing compounds, and the like.

Quality control of the water samples taken may be monitored and controlled by the PVT express laboratory on-site, and temperatures may be monitored in real time by a fiber optical cable monitoring system to ensure compliance at all times and maintain a proper history of the fluids before being discharged to the sea. Monitoring of the pre-discharge water parameters and recycling the water to the separation stage until it reaches required conditions allows for full process stability and full respect of all local environmental laws and regulations whole maximizing hydrocarbon production.

There are at least three options, or combinations thereof, available for the gas: flare off; compress and re-inject to gas production pipeline; or re-injected into the production line using separator pressure.

Data received from the various system modules may fed via wire, wireless, or optical transmission into a centralized, computerized data warehouse and displayed in a consolidated manner and user-friendly format where all parameters are monitored and alarm levels can be set. Once the operating envelope parameters are outside specifications dry by the operator, alarms may be automatically displayed and the necessary adjustment of the system made to ensure operation within the designed operating envelope. The data may be transmitted in real time to the client's offices and service company offices where real-time decision making may be made and proper monitoring of the systems and methods performed.

The term "reservoir" may include hydrocarbon deposits accessible by one or more wellbores. A "well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, diverted or non-diverted, and combinations thereof, for example a vertical well with a non-vertical component. The phrase "high temperature, high pressure" means any temperature and pressure conditions that are above atmospheric pressure and above 20° C.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of hydrocarbon production from a well, comprising:
   a first analyzing step of analyzing phases of hydrocarbon oil, gas and water in a mixture at flowing conditions as the mixture is extracted from the well to determine a relative amount of the hydrocarbon oil with respect to the mixture as a whole, a relative amount of the gas with respect to the mixture as a whole, and a relative amount of the water with respect to the mixture as a whole; and
   substantially separating the mixture into a hydrocarbon oil portion, a water portion, and a gas portion, wherein each respective portion contains substantially only the hydrocarbon oil, water or gas, respectively;
   a second analyzing step of analyzing the hydrocarbon oil portion and determining if the hydrocarbon oil portion meets a predetermined hydrocarbon oil standard, and treating any hydrocarbon oil portion that does not meet the predetermined hydrocarbon oil standard to meet the predetermined hydrocarbon oil standard; and
   a third analyzing step of analyzing the water portion to determine if the water portion meets a predetermined water standard and treating any water portion that does not meet the predetermined water standard to meet the predetermined water standard,
   wherein each of the first, second, and third analyzing steps occur simultaneously.

2. The method of claim 1, wherein each of the first, second, and third analyzing steps occur continuously and simultaneously with hydrocarbon production from the well.

3. A method of hydrocarbon production from a well, comprising:
   a first analyzing step of analyzing, using a first analyzer module, phases of hydrocarbon oil, gas and water in a mixture at flowing conditions as the mixture is extracted from the well;
   separating, using a separator module, the mixture into an oil portion, a water portion and a gas portion, each respective portion contains substantially only oil, water or gas, respectively;
   a second analyzing step of analyzing the separated oil portion using a second analyzer module and determining if the separated oil portion meets a predetermined hydrocarbon oil standard, and treating any hydrocarbon oil portion that does not meet the predetermined oil standard to meet the predetermined oil standard;
   transferring the hydrocarbon oil portion meeting the predetermined hydrocarbon oil standard to a predetermined hydrocarbon oil destination;
   a third analyzing step of analyzing the separated water portion, using a third analyzer module, to determine if the water portion meets a predetermined water standard and treating any separated water portion that does not meet the predetermined water standard to meet the predetermined water standard; and
   transferring the water portion meeting the predetermined water standard to a water destination,
   wherein each of the first, second, and third analyzing steps occur simultaneously.

4. The method of claim 3, wherein each of the first, second, and third analyzing steps occur continuously and simultaneously with hydrocarbon production from the well.

5. A modular system for hydrocarbon production optimization, comprising:
   a multiphase analyzer module for analyzing phases of hydrocarbon oil, gas and water of a mixture at flowing conditions as the mixture is extracted from a well;
   a separator module for substantially separating the mixture into hydrocarbon oil, water and gas portions, the respective portions containing substantially only hydrocarbon oil, water or gas, respectively;
   a hydrocarbon analyzer module for analyzing the separated hydrocarbon oil portion and determining if the hydrocarbon oil portion meets a predetermined oil standard;
   an oil treatment module for treating any separated hydrocarbon oil portion not meeting the predetermined oil standard to meet the predetermined oil standard;
   a water quality analyzer module for analyzing the water portion to determine if the water portion meets a predetermined water standard; and
   a water treatment module for treating any water portion not meeting the predetermined water standard to meet the predetermined water standard,
   a flow heating module for heating, when needed, the mixture to increase a temperature of the mixture to improve separation efficiency in the separator module, and
   a chemical injection module for injecting one or more chemicals into the mixture to modify mixture flow qualities in order to maximize separation efficiency of the separator module.

* * * * *